(12) United States Patent
Yang et al.

(10) Patent No.: US 7,333,872 B2
(45) Date of Patent: Feb. 19, 2008

(54) PRODUCT PROCESSING SYSTEM

(75) Inventors: Michael Yang, Taipei (TW); Guan-Yu Huang, Taipei (TW)

(73) Assignee: Inventec Corporation (TW)

( * ) Notice: Subject to any disclaimer, the term of this patent is extended or adjusted under 35 U.S.C. 154(b) by 0 days.

(21) Appl. No.: 11/523,181

(22) Filed: Sep. 18, 2006

(65) Prior Publication Data

US 2007/0255439 A1 Nov. 1, 2007

(30) Foreign Application Priority Data

May 1, 2006 (TW) ................................ 95115481 A

(51) Int. Cl.
*G06F 19/00* (2006.01)
*H01L 21/68* (2006.01)

(52) U.S. Cl. .................. 700/112; 700/228; 414/222.01

(58) Field of Classification Search .................. 700/99, 700/22, 112–114, 207, 228, 230; 414/222.01; 29/564, 822–824
See application file for complete search history.

(56) References Cited

U.S. PATENT DOCUMENTS

2005/0267619 A1* 12/2005 Tseng et al. ................. 700/112
2006/0231371 A1* 10/2006 Moliere et al. ........ 198/341.09

FOREIGN PATENT DOCUMENTS

JP           2001-80501    *    3/2001

* cited by examiner

*Primary Examiner*—Kidest Bahta
*Assistant Examiner*—Steven R. Garland
(74) *Attorney, Agent, or Firm*—Peter F. Corless; Steven M. Jensen; Edwards Angell Palmer & Dodge LLP

(57) ABSTRACT

A product processing system applicable to a production process for producing an electronic device is disclosed. The product processing system includes a plurality of processing apparatuses installed according to processing stages in the production process of the electronic device and configured to process the electronic device in the processing stages accordingly, a carrier component for carrying the electronic device; a plurality of carrier bodies installed in each of the processing apparatuses, provided with power parts for supplying power, configured to carry the carrier component, and configured to convey the electronic device on the carrier component to the processing apparatuses according to planned routes of the production process; a plurality of power supply portions installed on the carrier component and electrically connected to the power parts of the carrier bodies, so as to supply power required to process the electronic device in the processing stages while the electronic device on the carrier component is being conveyed by the carrier bodies, wherein the power is multiphase alternating current power; and a phase switching module adapted to evenly switch phases of power during the production process according to the number of phases provided by the power supply portions, thereby achieving integration of the production process of the electronic device.

17 Claims, 2 Drawing Sheets

PRODUCT PROCESSING SYSTEM

BACKGROUND OF THE INVENTION

1. Field of the Invention

The present invention relates to a product processing system for producing an electronic device, and more particularly, to a product processing system conducive to integration of a production process for producing the electronic device, thereby preventing instability of electrical performance or damage to the electronic device due to repeated or inappropriate plug-in and plug-out of the electronic device, increasing overall processing efficiency, and reducing the consumption of power in the production process.

2. Description of Related Art

The rapid development of electronic technology allows electronic products with a high level of integration and intelligence, such as notebook computer, liquid crystal display television (LCD TV), and other types of panel TV, to be versatile and relatively more audiovisually entertaining which, coupled with advantages like environment friendliness and low radiation, make the electronic products popular among customers.

LCD TV nowadays are produced in assembly lines, in which the operational staff of the production line are assigned to execute each and every assembly procedure separately, and after assembly, perform comprehensive testing on the finished products. The testing, which is intended for quality assurance, includes a front-end assembly test, an aging test, a white balance test, a mute test, and a back-end test. Testing is performed on the existing assembly lines step by step and in sequence. For instance, the front-end assembly test is executed in a specific test area first, and upon completion of the front-end assembly test, LCD TV are moved from the test area of the front-end assembly test to an aging test area (for example, an aging room) where the LCD TV are to undergo the aging test (by analogy, the other tests are performed in sequence, and thus they are not discussed herein.) To perform the testing, individual steps of the testing have to be carried out in their respective test areas in order to provide the power required for the LCD TV. Generally, a LCD TV uses a plug thereof to obtain the required power by electrically connecting to the power socket of each test area. It is, therefore, necessary to repeatedly plug-in and out of the plug of the LCD TV in order to complete the testing required to be performed in the whole assembly line, thereby adversely affecting the stability of the electrical performance of the LCD TV or even causing damage to the plug, and in consequence delivery of finished products is delayed. Moreover, testing efficiency decreases, as the steps of testing are separately performed in the existing assembly lines in sequence.

Furthermore, the power available to each testing step performed in the existing assembly line is always fixed-phase alternating current, whether single-phase or multiphase, (for example, an alternating current power of 110 V or 220 V), leading to considerable power consumption in the production process.

Therefore, there exists a need to develop a novel technique that can improve on the drawbacks of prior art techniques so as to prevent instability of electrical performance or damage to an electronic device due to repeated or inappropriate plug-in and plug-out of the electronic device, increase the overall processing efficiency, and reduce the consumption of power in the production process.

SUMMARY OF THE INVENTION

In light of the aforementioned drawbacks of prior art, a primary objective of the present invention is to provide a product processing system for integration of the production process of an electronic device, so as to prevent instability of electrical performance or damage to an electronic device due to repeated or inappropriate plug-in and plug-out of the electronic device.

Another objective of the present invention is to provide a product processing system for integration of the production process of an electronic device, so as to enhance the overall efficiency of the production process.

Yet another objective of the present invention is to provide a product processing system for reducing power consumption in the production process of an electronic device.

In order to achieve the above and other objectives, the present invention provides a product processing system to be applied to a production process for producing an electronic device. The product processing system comprises: a plurality of processing apparatuses installed according to processing stages in the production process of the electronic device and configured to process the electronic device in the processing stages accordingly; a carrier component for carrying the electronic device; a plurality of carrier bodies installed in each of the processing apparatuses, provided with power parts for supplying power, configured to carry the carrier component, and configured to convey the electronic device on the carrier component to the processing apparatuses according to planned routes of the production process; a plurality of power supply portions installed on the carrier component and electrically connected to the power parts of the carrier bodies, so as to supply power required to process the electronic device in the processing stages while the electronic device on the carrier component is being conveyed by the carrier bodies, wherein the power is multiphase alternating current power; and a phase switching module adapted to evenly switch phases of power during the production process according to the number of phases provided by the power supply portions.

Compared to prior art techniques, the product processing system disclosed by the present invention involves the interactive coordination of the processing apparatuses, the carrier component, the carrier bodies, the power supply portions, and the phase switching module, as well as the phase switching module switching phases of power evenly during the production process by means of the multiphase alternating current supplied by the power supply portions, thereby achieving the primary and other objects.

BRIEF DESCRIPTION OF DRAWINGS

The product processing system of the present invention can be fully understood by reading the following detailed description of the preferred embodiments, with reference made to the accompanying drawings, wherein.

DETAILED DESCRIPTION OF PREFERRED EMBODIMENT

The present invention is described in the following so that one skilled in the pertinent art can readily understand other advantages and effects of the present invention. The present invention may also be implemented and applied according to other embodiments, and the details may be modified based on different views and applications without departing from the spirit of the invention.

Figure 1:
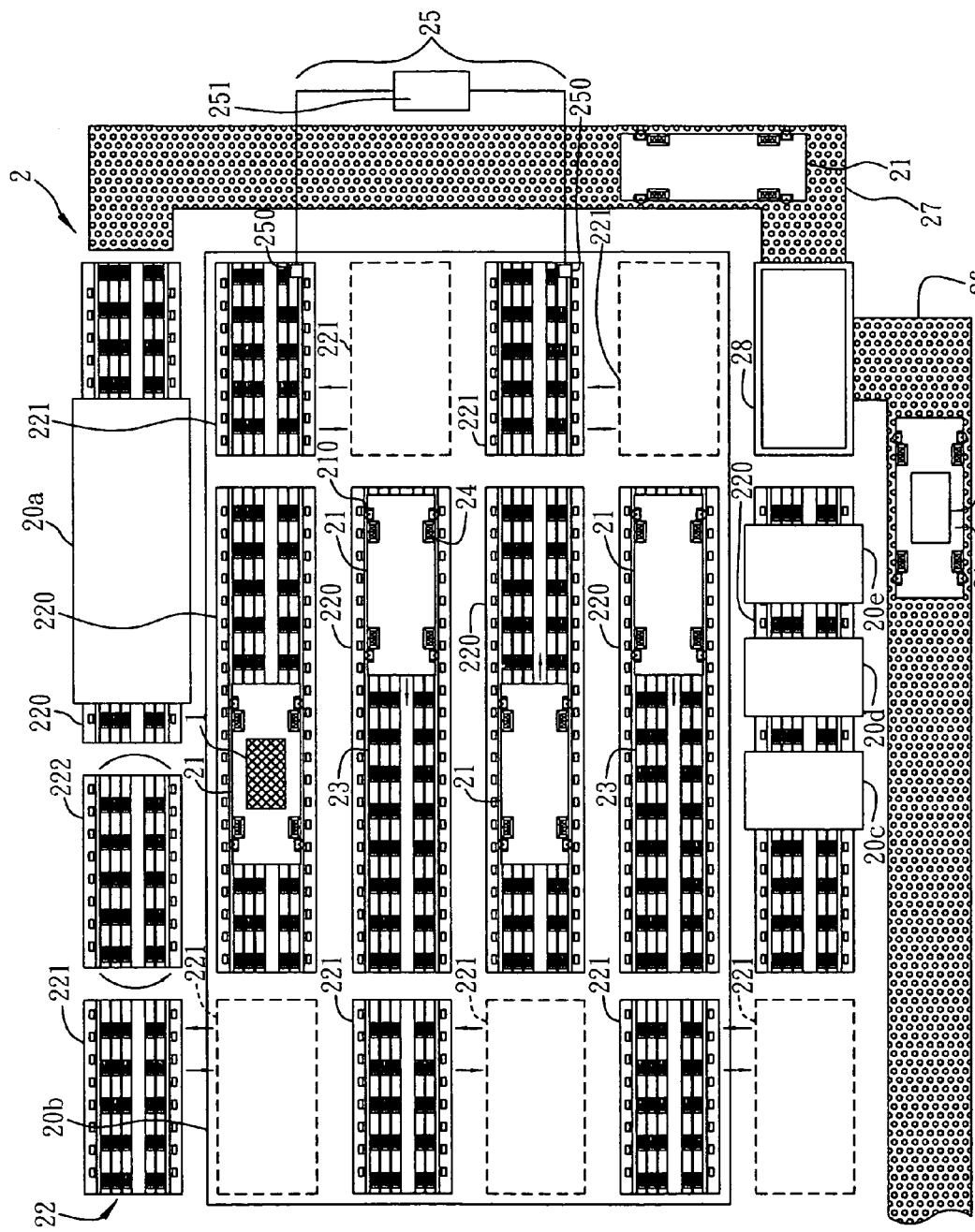
FIG. 1 is a top plan view showing the architecture of the embodiment of the product processing system in accordance with the present invention.
Figure 2:
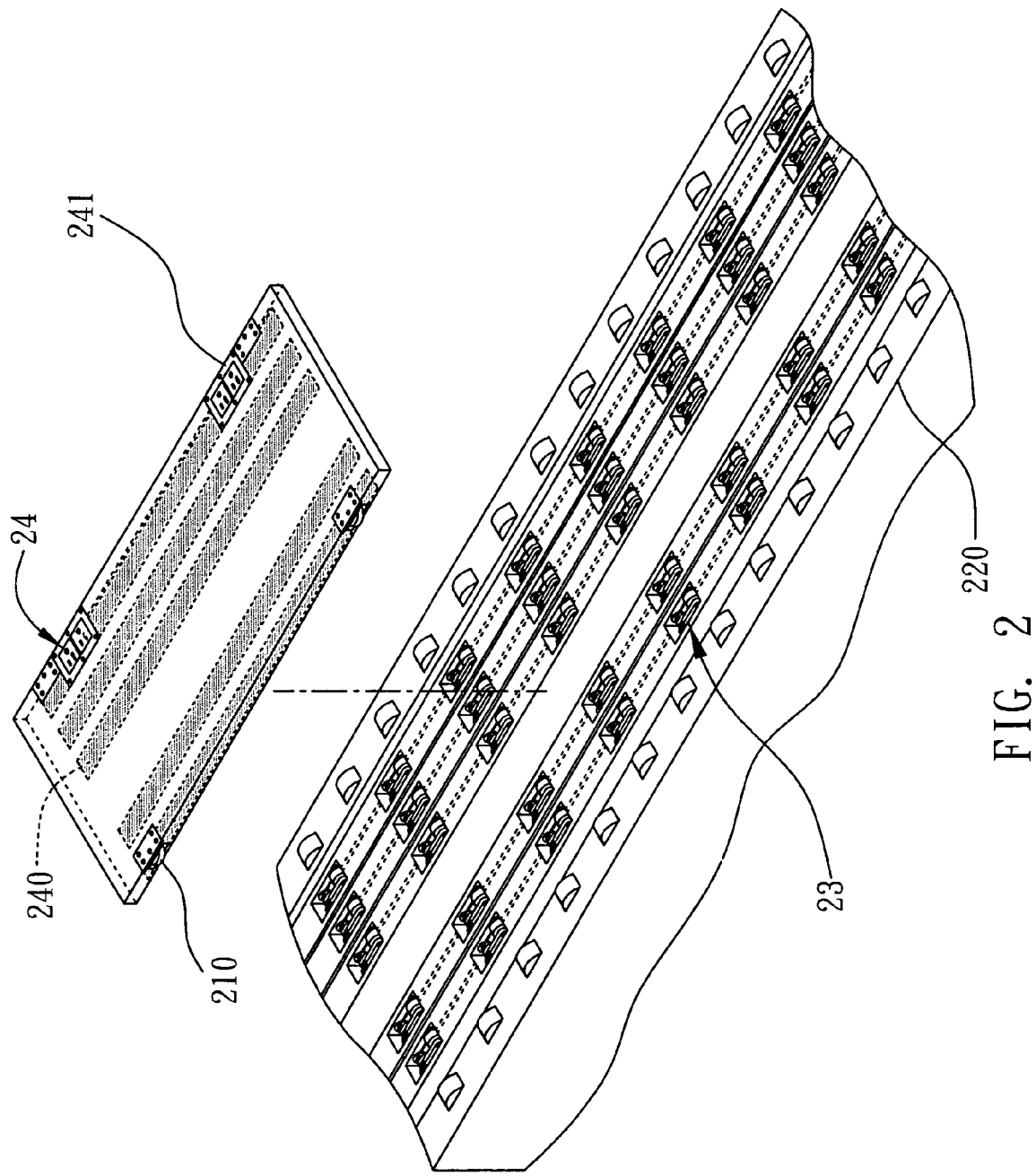
FIG. 2 is a schematic view showing the power supply portions and the power parts of the embodiment of the product processing system in accordance with the present invention.

FIG. 1 is a top plan view showing the architecture of the embodiment of the product processing system 2; and FIG. 2 is a schematic view showing the structure of some of the constituent components of the product processing system 2 according to the present invention. As shown, the product processing system 2 is applied to the production process of an electronic device 1, wherein the electronic device 1 is a liquid crystal display television (LCD TV). The production process includes a front-end assembly test, an aging test, a white balance test, a mute test, and a back-end test. As these processing stages are well-known in the art and thus will not be further detailed herein.

In this embodiment, the product processing system 2 comprises a plurality of processing apparatuses 20a, 20b, 20c, 20d and 20e, a carrier component 21, a plurality of carrier bodies 22, a plurality of power supply portions 24, and a phase switching module 25.

Each of the plurality of processing apparatuses 20a, 20b, 20c, 20d and 20e is installed according to every processing stage in the production process of the electronic device 1, for performing a corresponding process on the electronic device 1 in each of the processing stages. In this embodiment, the processing apparatus 20a is used to perform the front-end assembly test of the production process; the processing apparatus 20b is used to perform the aging test of the production process; the processing apparatus 20c is used to perform the white balance test of the production process; the processing apparatus 20d is used to perform the mute test of the production process; the processing apparatus 20e is used to perform the back-end test of the production process of the electronic device 1. It should be noted that each of the plurality of processing apparatuses 20a, 20b, 20c, 20d and 20e is illustrated in schematic views and the application of processing apparatuses can be adjusted if necessary, for exampling, increasing the number of the processing apparatuses, and changing the positions of the processing apparatuses.

The carrier component 21 is configured for carrying the electronic device 1. In this embodiment, the carrier component 21 is conveyed along the carrier bodies 22 by means of rollers 210, and the carrier component 21 is a pallet. In this embodiment, the drawings show a total of six carrier components 21, but this embodiment is not intended to limit the number of the carrier components 21 in practice.

The plurality of carrier bodies 22 are installed in processing apparatuses and provided with power parts 23 configured to supply power. The carrier bodies 22 are adapted for carrying the carrier component 21 and conveying the electronic device 1 on the carrier component 21 to the processing apparatuses according to planned routes of the production process. In this embodiment, the carrier bodies 22 comprise a plurality of first carrier bodies 220 and second carrier bodies 221. The first carrier bodies 220 are disposed in parallel, and the second carrier bodies 221 are disposed at the output and input terminals of the planned route of the first carrier bodies 220. In a mobile manner, one of the second carrier bodies 221 receives the carrier component 21 from the input terminal of the planned route of one of the first carrier bodies 220, and then the carrier component 21 is conveyed from the output terminal of the planned route of the first carrier body 220 to the input terminal of the planned route of another first carrier body 220. Upon completion of conveyance, another carrier component 21 is conveyed in the aforesaid way anew, starting from the starting point. As shown in the drawing, a third carrier body 222 is furthered disposed. The third carrier body 222 is adapted to rotate the electronic device 1, which lies on the carrier component 21 carried by the third carrier body 222, to an appropriate conveying position so as to proceed to subsequent processing stages, such as an aging test in the production process of the electronic device 1. Moreover, as shown in the drawing, the ending point of the conveying route of the carrier bodies 22 is connected with a packaging production line 26 and a pallet return line 27 via a forwarding carrier body 28, and the pallet return line 27 is connected with the starting point of the conveying route of the carrier bodies 22.

The forwarding carrier body 28 is configured to determine whether a forwarding route is the packaging production line 26 or the pallet return line 27, using a first detecting unit (not shown). The first detecting unit is configured to detect whether the carrier component 21 on the forwarding carrier body 28 is carrying the electronic device 1; if so, the carrier component 21 carrying the electronic device 1 will be conveyed to the packaging production line 26, otherwise the carrier component 21 will be conveyed to the pallet return line 27. The packaging production line 26 is configured to process the packaging and delivery of the electronic device 1. The pallet return line 27 is configured to convey the carrier component 21 not carrying the electronic device 1 to the starting point of the conveying route of the carrier bodies 22 so as to proceed with a related processing task.

The plurality of power supply portions 24 are correspondingly installed on the carrier component 21 and electrically connected to the power parts 23 of the carrier bodies 22. The plurality of power supply portions 24 supply power required to process the electronic device 1 in the processing stages while the electronic device 1 on the carrier component 21 is being conveyed by the carrier bodies 22, wherein the power is multiphase alternating current power. In this embodiment, the power supply portions 24 comprise a plurality of conductive metal rods 240 and sockets 241 electrically connected to the conductive metal rods 240, and the conductive metal rods 240 are electrically connected to the power parts 23 of the carrier bodies 22. The electronic device 1 is provided with a plug (not shown) corresponding to the sockets 241 of the power supply portions 24, and the power parts 23 are conductive metal guiding wheels corresponding to the conductive metal rods 240, as shown in the drawing.

The phase switching module 25 is adapted to evenly switch phases of power according to the number of phases provided by the power supply portions 24. As the product processing system 2 of the present invention is configured to achieve integration of the production process of the electronic device 1 (that is, performing every processing stage in the same assembly line), therefore, the even switching of power phases in the production process reduces the consumption of power in the production process of the electronic device 1.

In this embodiment, the phase switching module 25 comprises a plurality of second detecting units 250 and a central control unit 251. The second detecting units 250 are evenly disposed on the carrier bodies 22 throughout the production process according to the number of phases of the power (for example, for three-phase alternating current, the phases are, namely phases R, S, and T; and two second detecting units 250 are required for the switching of the phases R, S, and T). The central control unit 251 is electrically connected to the second detecting units 250 and configured to switch the phases of the power supplied by the power supply portions 24 on the carrier component 21 (while lines are used in the drawing to indicate electrical connections, electrical connection methods of the present invention are not limited to a wired connection; instead, any form of wire connections is applicable to the present invention; the central control unit 251 may be installed at the local end or at the remote end). The second detecting units 250 are configured to detect from an installation position whether one of the carrier bodies 22 is carrying the electronic device 1 thereon, and if so, the central control unit 251 will be actuated to switch the phases of the power, wherein the power is three-phase alternating current power of 110 V or 220 V, or having both 110 V and 220 V (in this embodiment, the 220 V power is supplied by means of three conductive metal rods 240, whereas the 110 V power is supplied by means of two conductive metal rods 240, and further, the phase switching module 25 controls phases of the power by means of the conductive metal rods 240; the control of phases is well known in the art, therefore the description thereof is omitted herein for brevity.)

Summarizing the above, the product processing system disclosed by the present invention is characterized by the interactive coordination of the processing apparatuses, the carrier component, the carrier bodies, the power supply portions, and the phase switching module, thereby achieving integration of the production process of the electronic device. The product processing system disclosed by the present invention is advantageous over the prior art in that it not only prevents instability of electrical performance or damage to an electronic device due to repeated or inappropriate plug-in and plug-out of the electronic device, but it also increases overall processing efficiency. Moreover, the phase switching module of the present invention utilizes the multiphase alternating current power supplied by the power supply portions to evenly switch the phases of power so as to reduce the consumption of power in the production process of the electronic device.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A product processing system applied to a production process for producing an electronic device, the product processing system comprising:
    a plurality of processing apparatuses installed according to processing stages in the production process of the electronic device and configured to process the electronic device in the processing stages accordingly;
    a carrier component for carrying the electronic device;
    a plurality of carrier bodies installed in each of the processing apparatuses, provided with power parts for supplying power, configured to carry the carrier component, and configured to convey the electronic device on the carrier component to the processing apparatuses according to planned routes of the production process;
    a plurality of power supply portions installed on the carrier component and electrically connected to the power parts of the carrier bodies, so as to supply power required to process the electronic device in the processing stages while the electronic device on the carrier component is being conveyed by the carrier bodies, wherein the power is multiphase alternating current power; and
    a phase switching module adapted to evenly switch phases of power during the production process according to the number of phases provided by the power supply portions.

2. The product processing system according to claim 1, wherein the electronic device is a liquid crystal display television (LCD TV).

3. The product processing system according to claim 1, wherein the processing stages of the production process comprise a front-end assembly test, an aging test, a white balance test, a mute test, and a back-end test.

4. The product processing system according to claim 1, wherein the carrier component is conveyed along the carrier bodies by means of rollers.

5. The product processing system according to claim 1, wherein the carrier component is a pallet.

6. The product processing system according to claim 1, wherein the carrier bodies comprise a plurality of first carrier bodies and second carrier bodies, the first carrier bodies being disposed in parallel, the second carrier bodies being disposed at output and input terminals of a planned route of the first carrier bodies, in a mobile manner one of the second carrier bodies receiving a carrier component from the input terminal of the planned route of one of the first carrier bodies and then the carrier component being conveyed from the output terminal of the planned route of the first carrier body to an input terminal of a planned route of another first carrier body, upon completion of conveyance another carrier component being conveyed anew, starting from a starting point.

7. The product processing system according to claim 1, wherein an ending point of a conveying route of the carrier bodies is connected with a packaging production line and a pallet return line via a forwarding carrier body, and the pallet return line is connected with a starting point of the conveying route of the carrier bodies.

8. The product processing system according to claim 7, wherein the forwarding carrier body is configured to determine whether a forwarding route is the packaging production line or the pallet return line, using a first detecting unit.

9. The product processing system according to claim 8, wherein the first detecting unit is configured to detect whether the carrier component on the forwarding carrier body is carrying the electronic device, and if so, the carrier component carrying the electronic device will be conveyed to the packaging production line, otherwise the carrier component will be conveyed to the pallet return line.

10. The product processing system according to claim 7, wherein the packaging production line is configured to process the packaging and delivery of the electronic device.

11. The product processing system according to claim 7, wherein the pallet return line is configured to convey the carrier component not carrying the electronic device to the starting point of the conveying route of the carrier bodies.

12. The product processing system according to claim 1, wherein the power supply portions comprise a plurality of conductive metal rods and sockets electrically connected thereto, and the conductive metal rods are electrically connected to the power parts of the carrier bodies.

13. The product processing system according to claim 12, wherein the electronic device is provided with a plug corresponding to the sockets of the power supply portions.

14. The product processing system according to claim 12, wherein the power parts are conductive metal guiding wheels corresponding to the conductive metal rods.

15. The product processing system according to claim 1, wherein the phase switching module comprises a plurality of second detecting units and a central control unit, the second detecting units being evenly disposed on the carrier bodies according to the number of phases of the power throughout the production process, the central control unit being electrically connected to the second detecting units and configured to switch the phases of the power supplied by the power supply portions on the carrier component, the second detecting units being configured to detect from an installation position whether one of the carrier bodies is carrying the electronic device thereon, and if so, the central control unit will be actuated to switch the phases of the power.

16. The product processing system according to claim 1, wherein the power is three-phase alternating current power.

17. The product processing system according to claim 16, wherein the voltage of the three-phase alternating current power is 110 V and/or 220 V.

* * * * *